US008412622B2

United States Patent
Ariff et al.

(10) Patent No.: US 8,412,622 B2
(45) Date of Patent: Apr. 2, 2013

(54) SYSTEMS AND METHODS FOR DETERMINING A FINANCIAL HEALTH INDICATOR

(75) Inventors: Kazi M. Ariff, Quincy, MA (US); Carol A. Smith, Edgartown, MA (US); Shane A. Johnson, Charlotte, NC (US); Russell W. Tipper, Boston, MA (US); Yicong Li, Lexington, MA (US); Sean M. O'Connor, Scituate, MA (US); Thomas D. Kelley, Hingham, MA (US); Susan S. Thomas, Gastonia, NC (US); William F. Borowski, Millbury, MA (US); William J. Aheron, Charlotte, NC (US); Judith M. Anderson, East Walpole, MA (US); Steven K. Hayes, Bemus Point, NY (US); Neal G. Wolfson, Lexington, MA (US); Jeffrey P. Judd, Boston, MA (US); James P. Kirkman, Acton, MA (US); Jeffrey H. Bierer, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 292 days.

(21) Appl. No.: 12/414,435

(22) Filed: Mar. 30, 2009

(65) Prior Publication Data

US 2010/0250430 A1    Sep. 30, 2010

(51) Int. Cl.
*G06Q 40/00* (2012.01)
(52) U.S. Cl. .......................................... 705/38
(58) Field of Classification Search .............. 705/38
See application file for complete search history.

(56) References Cited

U.S. PATENT DOCUMENTS

| 5,812,988 | A | 9/1998 | Sandretto |
| 5,960,415 | A | 9/1999 | Williams |
| 7,050,997 | B1 | 5/2006 | Wood, Jr. |
| 7,177,834 | B1 | 2/2007 | Maestle |

(Continued)

OTHER PUBLICATIONS

Hamm, Trent. "How to Budget Using ING Direct (or Another Full-Service Online Bank)". The Simple Dollar: Financial talk for the rest of us, Jun. 12, 2008 [Retrieved on May 11, 2010]—Retrieved from the Internet: <URL:http://www.thesimpledollar.com/2008/06/12/how-to-budget-using-ing-direct-or-another-full-service-online-bank/>.

(Continued)

*Primary Examiner* — Hani M Kazimi
*Assistant Examiner* — Hatem M Ali
(74) *Attorney, Agent, or Firm* — Michael A. Springs; Moore & Van Allen, PLLC; James C. Edwards (57) ABSTRACT

Systems, methods, and computer program products are provided for a financial health indicator. The financial health indicator provides a dynamic indication of a user's financial health in terms of their current credit worthiness and their current ability to save in relation to a budget. In this regard, the financial health indicator is based on a user's credit report score, such as one or more FICO type credit scores and the user's savings as indicated by a budget tracking system. In embodiments of the invention in which the financial health indicator is implemented in conjunction with a budget tracking system, the financial health indicator provides necessary feedback to the user that serves to inform the user as to how they are performing in terms of staying on track to their individual budget allocations. Additionally, in certain embodiments, the provider of the budget tracking system may provide for awards based on achieving a predefined financial health indicator level and/or score.

36 Claims, 8 Drawing Sheets

U.S. PATENT DOCUMENTS

| | | | |
|---|---|---|---|
| 7,254,548 | B1 | 8/2007 | Tannenbaum |
| 2002/0010612 | A1 | 1/2002 | Smith et al. |
| 2002/0123949 | A1 | 9/2002 | VanLeeuwen |
| 2002/0133437 | A1 | 9/2002 | Ansley |
| 2002/0156710 | A1 | 10/2002 | Ryder |
| 2002/0174006 | A1 | 11/2002 | Rugge et al. |
| 2003/0120572 | A1* | 6/2003 | Coventry et al. ............ 705/35 |
| 2004/0068468 | A1 | 4/2004 | North |
| 2005/0027632 | A1 | 2/2005 | Zeitoun et al. |
| 2005/0097033 | A1 | 5/2005 | Pretell et al. |
| 2005/0182699 | A1 | 8/2005 | Jaffe |
| 2006/0020533 | A1* | 1/2006 | Lee ............................. 705/35 |
| 2006/0155617 | A1 | 7/2006 | Dasilva |
| 2007/0088641 | A1 | 4/2007 | Aaron et al. |
| 2007/0174163 | A1 | 7/2007 | Griffin |
| 2007/0260532 | A1 | 11/2007 | Blake, III |
| 2008/0147567 | A1 | 6/2008 | Perry et al. |
| 2008/0195438 | A1 | 8/2008 | Manfredi et al. |
| 2008/0201269 | A1 | 8/2008 | Hollins et al. |
| 2008/0245854 | A1 | 10/2008 | Monden |
| 2008/0270292 | A1* | 10/2008 | Ghosh et al. ................ 705/38 |
| 2008/0313065 | A1 | 12/2008 | Eder |
| 2009/0024540 | A1 | 1/2009 | Ryder |
| 2009/0048957 | A1* | 2/2009 | Celano ......................... 705/35 |
| 2009/0070161 | A1 | 3/2009 | Augusto et al. |
| 2009/0089190 | A1* | 4/2009 | Girulat, Jr. ................... 705/30 |
| 2009/0319438 | A1 | 12/2009 | Jain |
| 2010/0094697 | A1 | 4/2010 | Cavanaugh |

OTHER PUBLICATIONS

Sager. "Re: Advanced Budget Software". Blackberry Forums at CrackBerry.com, Mar. 17, 2009 [retrieved on May 11, 2010] Retrieved from the Internet: <URL: http://forums.crackberry.com/f35/advanced-budget-software-184479/>.

International Search Report and the Written Opinion of the International Searching Authority mailed May 12, 2010 for International Application No. PCT/US 10/28198.

International Search Report and the Written Opinion of the International Searching Authority mailed May 14, 2010 for International Application No. PCT/US 10/28197.

International Search Report and the Written Opinion of the International Searching Authority mailed May 14, 2010 for International Application No. PCT/US 10/28194.

International Search Report and the Written Opinion of the International Searching Authority mailed May 19, 2010 for International Application No. PCT/US 10/028188.

AdviceAmerica Webpage, "Financial Planning Made Simple", Dec. 9, 2004 version. Pulled from Wayback Machine Apr. 5, 2011.

Hackerman, "Financial Modeling: A powerful tool for planning and decision support," Managerial Planning, 30:5, pp. 21-25, Mar./Apr. 1982.

* cited by examiner

SYSTEMS AND METHODS FOR DETERMINING A FINANCIAL HEALTH INDICATOR

REFERENCE TO CO-PENDING APPLICATIONS FOR PATENT

The present Application for Patent is related to the following co-pending United States Patent Applications:

"Systems and Methods for Determining Target Budget Allocation", inventors Ariff et al., having an application Ser. No. 12/414,428, filed concurrently herewith, assigned to the assignee hereof, and expressly incorporated by reference herein "Systems and Methods for Budget Guardrails", inventors Ariff et al., having an application Ser. No. 12/414,433, filed concurrently herewith, assigned to the assignee hereof, and expressly incorporated by reference herein; and "Systems and Methods for Determining the Budget Impact of Purchases, Potential Purchases and Cost Adjustments", inventors Ariff et al., having an application Ser. No. 12/414,439, filed concurrently herewith, assigned to the assignee hereof, and expressly incorporated by reference herein.

FIELD

In general, embodiments herein disclosed relate to systems, methods, and computer program products for determining a financial health indicator and, more specifically, determining a dynamic financial health indicator based on current credit report scores and current budget savings.

BACKGROUND

In general, most individuals have a difficult time saving money. This problem is evident in the United States where the national average personal savings rate has recently moved from the positive to the negative for the first time since the Great Depression, meaning Americans are spending more than they are saving. While statistics show that 78 million Americans will retire in the next 20 years, long-term financial planning and retirement goals for the vast majority of these individuals are cast in doubt by the inability to save.

Furthermore, problems associated with inadequate savings not only affect long-term retirement plans, but also come to the forefront during prolonged recessionary periods, such as the global recession currently being experienced. With individuals being displaced from their employment at alarming rates, these individuals need to call on their short-term savings as a means of support in the interim. In this regard, the need to address the savings problem takes on a sense of urgency.

However, admitting a savings problem and doing something about it are not one in the same. Saving money requires an individual to budget properly and, for whatever reason, be it unwillingness, inability or the like, individuals have shown a proven tendency not to budget properly. This problem is exasperated in a downturned economy in which a whole new sector of the population must accept at least a slight decrease, and in some instances a significant decrease, in their standard of living. Thus, the need to budget, and moreover budget effectively, becomes imperative.

Currently, many commercial applications exist that assist individuals with budgeting. For example, Microsoft® Money, available from Microsoft Corporation of Redmond, Washington and Intuit® Quicken®, available from Intuit Incorporated of Mountain View, Calif. are two such commercially available budget applications. However, these applications may be limited in the data resources they have available to assess a user's current budget allocation and determine or make recommendations for a user's target budget allocation. Moreover, these applications may be limited in terms of the data resources they have available to automatically track an individual's spending, i.e., the individual's ability to stay on budget. In addition to possible data resource limitations, the corporations that provide these applications are not in the business of providing their users with financial planning and/or financial advice and, therefore, do not employ a staff dedicated to ensuring their users financial security. Therefore, when using these types of commercial budget applications, the user is on their own when it comes to making financial decisions that affect their budget, short-term savings and/or long-term savings.

Additionally, known budgeting applications do not possess the ability to ensure that users adhere to their assigned budgets. In this regard, the commercial entities that provide such applications are not in a position to reward and/or penalize users that are successful or fail to stay on budget. In addition, currently existing budgeting applications do not possess the ability to provide the user a comprehensive and dynamic financial health indicator that takes into account various factors that cumulatively affect the user's overall financial health.

In addition, current budgeting applications do not provide for a spending deterrence. In this regard, current budgeting applications do not assess the budget ramifications of proposed expenditures, recurring expenditures or cost adjustments to fixed expenditures, such as rent, house payment, automobile payment and the like.

Up until now, financial institutions have been focused on providing their customers with investment services, loan services and the like. However, by shifting the financial institution mindset from an investment strategy to a budget strategy, these institutions, such as banks and the like, can capitalize on an increase in customer assets (i.e., savings), an increase in customer retention, and lower the credit risk for their customer base. Additionally, financial institutions have the ability to leverage instrumental budget-related data that may be otherwise unavailable to other commercial entities providing budget applications.

Therefore, a need exists to develop systems, methods, apparatus, computer program products and the like for an improved budgeting system. In this regard, the budget system should improve upon the accuracy of the determination of the user's current budget allocation and provide for a more comprehensive and focused means for determining and/or recommending a target budget allocation to the user. In addition, desired systems, methods, apparatus, computer program products and the like should provide for a better means to ensure that the user stays on track in terms of their budget allocation and a means to reward and/or penalize the user if they do/do not stay on their budgeting track. Additionally, the desired systems, methods, apparatus, computer program products and the like should provide for a dynamic tool that indicates how well a user is doing in regards to meeting their budget, making improvements in savings and/or improving their overall creditworthiness. Moreover, the desired systems, methods, apparatus, computer program products and the like should provide for a spending deterrence that affectively limits the amount of spending incurred by the user, thereby further assisting the user in adhering to their respective target budget allocation.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, systems and computer program products are defined that provide for a financial health indicator. The financial health indicator provides a dynamic indication of a user's financial health in terms of their current credit worthiness and their current ability to save in relation to a budget. In this regard, the financial health indicator is based on a user's credit report score, such as one or more FICO type credit scores and the user's budget savings. In embodiments of the invention in which the financial health indicator is implemented in conjunction with a budget tracking system, the financial health indicator provides necessary feedback to the user that serves to inform the user as to how they are performing in terms of staying on track to their individual budget allocations. Additionally, in certain embodiments, the provider of the budget tracking system may provide for awards based on achieving a predefined financial health indicator level and/or score.

According to one embodiment of the invention, a method for providing a financial health indicator is defined. The method includes providing for a user's credit report score and providing for the user's budget savings. The method additionally includes determining a user's financial health indicator based on the user's credit report score and the user's budget savings and communicating, electronically, the financial health indicator to the user.

According to one specific embodiment of the method, providing for a user's credit report score may further include tracking at least one credit report bureau for the user's credit report score and, specifically, tracking a plurality credit report bureaus for the user's credit report score and averaging the user's credit report score from the plurality of credit report bureaus. In the same regard, according to other specific embodiments of the method, providing for the user's budget savings may further include tracking the user's expenditures and comparing the user's expenditures to the user's predetermined targeted budget allocation.

In other specific embodiments of the method, determining a user's financial health indicator further comprises determining, dynamically, the user's financial health indicator based on dynamically tracking the user's credit report score and dynamically tracking the user's budget savings. As such, the financial health indicator may dynamically fluctuate based on budget-related expenditures or savings in much the same manner that a human pulse fluctuates based on physical activity.

According to other specific embodiments of the method, communicating, electronically, the financial health indicator to the user may further provide for displaying of the financial health indicator on an online-accessible budget system program and/or on the user's wireless communication device. For example, the financial health indicator may be displayed via a dashboard-type application on a user's mobile device, such as a cellular telephone, personal data assistant (PDA) or the like.

In one embodiment of the method, determining a user's financial health indicator may further define the financial health indicator as numerical financial health score or an alpha financial health grade. While in other embodiments of the method, determining a user's financial health indicator may further define the financial health indicator as a color within a financial health color spectrum. For example, green may indicate high financial health, yellow may indicate average financial health and red may indicate low financial health.

Additionally, other specific embodiments of the method may include tracking the user's financial health indicator. In such embodiments, the method may also include determining if the user's financial health indicator achieves a predetermined financial health indicator threshold and awarding, automatically, a financial health indicator reward if the user's financial health indicator achieves the predetermined financial health indicator threshold. The financial health indicator reward may include, but is not limited to, a preferred rate of return on a financial institution account, a preferred price on a financial institution product or a gift.

An apparatus for providing a digital health indicator defines yet another embodiment of the invention. The apparatus, which may include multiple devices, includes a computer platform having at least one processor and a memory. The apparatus also includes a budget module stored in the memory, executable by the processor and operable to track expenditures for users. The budget module includes a financial health indicator routine operable to provide for a user's credit report score and user's budget savings, determine a user's financial health indicator based on the user's credit report score and the user's budget savings and initiate electronic communication of the financial health indicator to the user.

According to certain embodiments of the apparatus, the financial health indicator routine may be further operable to determine, dynamically, the user's financial health indicator based on dynamically tracking the user's credit report score and dynamically tracking the user's budget savings. Additionally, according to one specific embodiment of the apparatus, the financial health indicator routine may be further operable to track at least one credit report bureau for the user's credit report score and, in one particular embodiment, track a plurality of credit report bureaus for the user's credit report score and average the user's credit report scores from the plurality of credit report bureaus. In the same regard, according to specific embodiments of the apparatus, the financial health indicator routine may be further operable to track the user's expenditures and compare the user's expenditures to the user's predetermined targeted budget allocation.

In still further specific embodiments of the apparatus, the budget module may include a target budget allocation determiner routine operable to determine the user's predetermined budget allocation based on the user's current budget allocation and responses to a budget profile questionnaire. Alternatively, the budget module may further include target budget allocation selection routine operable to determine peer budget allocation data associated with the user, provide the peer budget allocation data to the user and receive user selections for the target budget allocation based on providing the user with peer budget allocation data.

According to certain embodiments of the apparatus, the financial health indicator routine is further operable to provide for the display of the financial health indicator on an online-accessible budget system program. Additionally, the financial health indicator routine may be further operable to provide for initiating the display of the financial health indicator on the user's wireless communication device, such as cellular telephone, personal data assistant (PDA) or the like.

According to other optional embodiments of the apparatus, the budget module further comprises a financial health indicator tracking routine operable to track the user's financial health indicator. In such aspects, the financial health indicator tracking module may be further operable to determine if the user's financial health indicator achieves a predetermined financial health indicator threshold. In such aspects, the financial health indicator tracking module may further be operable to automatically determine a financial health indicator reward if the user's financial health indicator achieves the predetermined financial health indicator threshold. The financial health indicator reward may include, but is not limited to, a preferred rate of return on a financial institution account, a preferred price on a financial institution product or a product/gift.

A computer program product provides for yet another embodiment of the invention. The computer program product includes computer-readable medium. The medium includes a first set of codes for causing a computer to provide for a user's credit report score and a second set of codes for causing a computer to provide for the user's budget savings. The medium also includes a third set of codes for causing a computer to determine a user's financial health indicator based on the user's credit report score and the user's budget savings and a fourth set of codes for causing a computer to communicate, electronically, the financial health indicator to the user.

Thus, methods, systems, computer program products and the like are described in detail herein, which provide for a financial health indicator. The financial health indicator provides a dynamic indication of a user's financial health in terms of their current credit worthiness and their current ability to save in relation to a budget. In this regard, the financial health indicator is based on a user's credit report score, such as one or more FICO type credit scores and the user's savings as indicated by a budget tracking system. In embodiments of the invention in which the financial health indicator is implemented in conjunction with a budget tracking system, the financial health indicator provides necessary feedback to the user that serves to inform the user as to how they are performing in terms of staying on track to their individual budget allocations. Additionally, in certain embodiments, the provider of the budget tracking system may provide for awards based on achieving a predefined financial health indicator level and/or score.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, methods, systems, computer programs and the like are herein disclosed that provide for a financial health indicator. The financial health indicator provides a dynamic indication of a user's financial health in terms of their current creditworthiness and their current ability to save in relation to a budget. In this regard, the financial health indicator is based on a user's credit report score, such as one or more FICO type credit scores and the user's budget savings. In embodiments of the invention in which the financial health indicator is implemented in conjunction with a budget tracking system, the financial health indicator provides necessary feedback to the user that serves to inform the user as to how they are performing in terms of staying on track to their individual budget allocations. Additionally, in certain embodiments, the provider of the budget tracking system may provide for awards based on achieving a predefined financial health indicator level and/or score.

Figure 1:
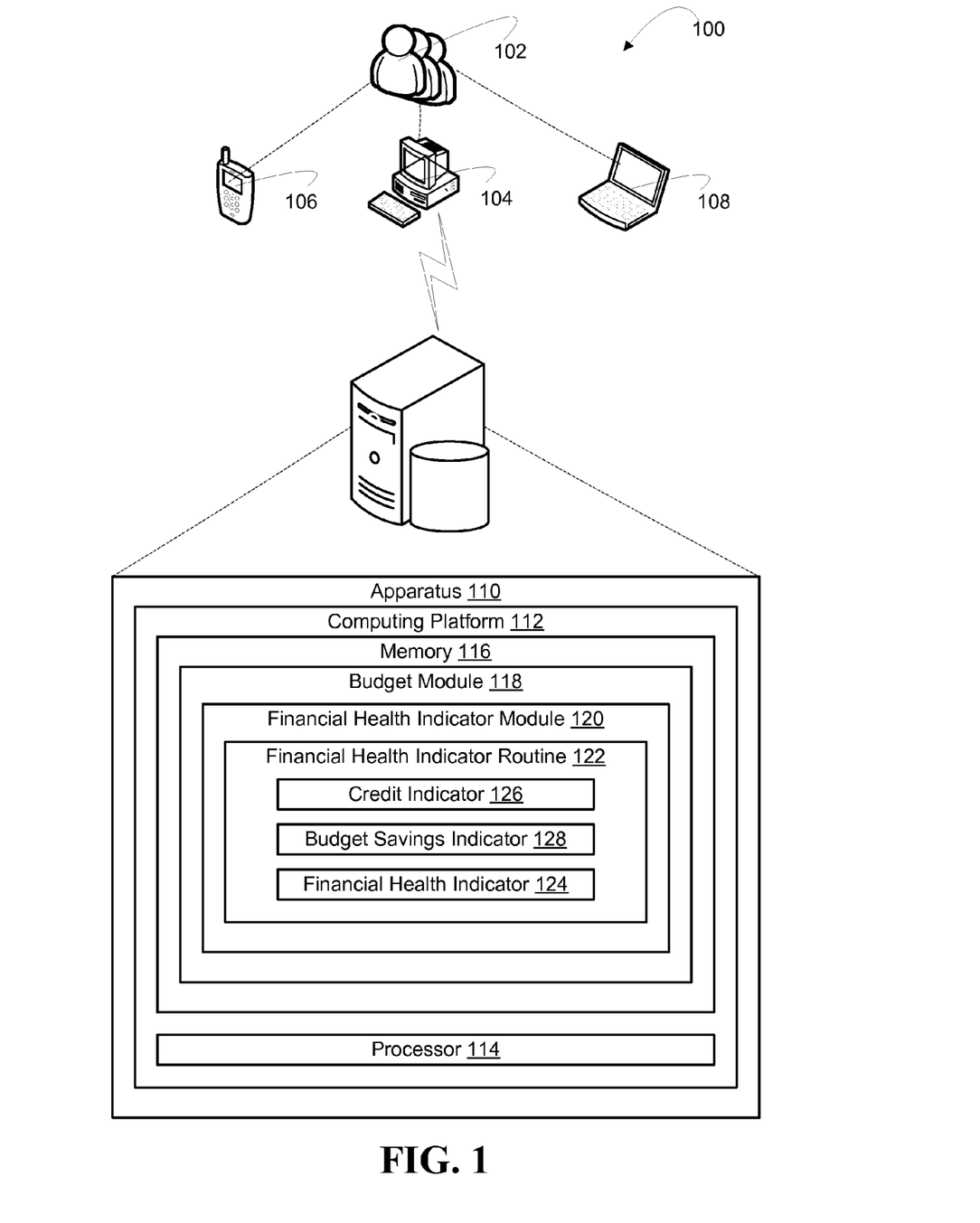
FIG. 1 is a block diagram depiction of a system for budget tracking, according to an embodiment of the present invention.

Referring to FIG. 1, a block diagram is depicted of a budget tracking system 100 that provides for a user 102 to access the system wirelessly or otherwise, to track their pre-defined budget from any networked device, such as a PC 104, or a portable device, such as cellular telephone 106 or laptop computer 108. In one embodiment, the budget system 100 may be a web-based system that provides for the user to access budget tracking data from any device providing Internet access.

The budget tracking system 100 also includes an apparatus 110, which may include multiple devices, for executing the budget tracking system 100 and, in particular, an apparatus configured for providing a financial health indicator, in accordance with an embodiment of the invention. The apparatus 110 includes a computing platform 112 having at least one processor 114 and a memory 116. The memory 116 includes a budget module 118 that is operable to implement a budget tracking system that includes, but is not limited to, a Financial Health Indicator (FHI) module 120.

The financial health indicator module 120 includes a financial health indicator 122 routine operable to determine a budget user's financial health indicator 124 based on a credit indicator 126 and a budget savings indicator 128. According to one embodiment of the present invention, the financial health indicator module 120 may be configured to monitor or track the user's credit indicator, as provided by commercial credit report bureaus, such as Equifax®, TransUnion®, Experian® and the like, which provide a user's credit score. In one specific embodiment, the financial health indicator module may track/monitor three credit reporting bureaus, such as Equifax®, TransUnion®, Experian® and the like, and average the score provided by the three credit reporting bureaus to result in a composite credit indicator/score 126.

According to specific embodiments of the invention, the budget module 118 may track the user's ability to adhere to target budget allocation in the short-term or long-term and, in doing so, provide for the user's resulting budget savings. In turn, the financial health indicator routine 122 relies on the budget savings or a budget savings score derived from the budget savings as the budget savings indicator 128 that is used to determine the financial health indicator 124.

Since both the credit indicator 126 and the budget saving indicator 128 reflect real-time or near-real-time credit and savings data, the resulting financial health indicator 124 is a dynamic indicator of the budget user's current financial health that acts as the financial pulse for the budget user. In this regard, the budget user can dynamically assess their current financial state to gauge how well they are doing in terms of budget savings and to gauge improvements or decline in their creditworthiness.

It should be noted that while specific embodiments of the invention may rely solely on the credit indicator 126 and budget savings indicator 128 to determine a financial health indicator 124, in other embodiments of the invention other factors related to the user's financial health may also be used to determine the user's financial health indicator.

Figure 2:
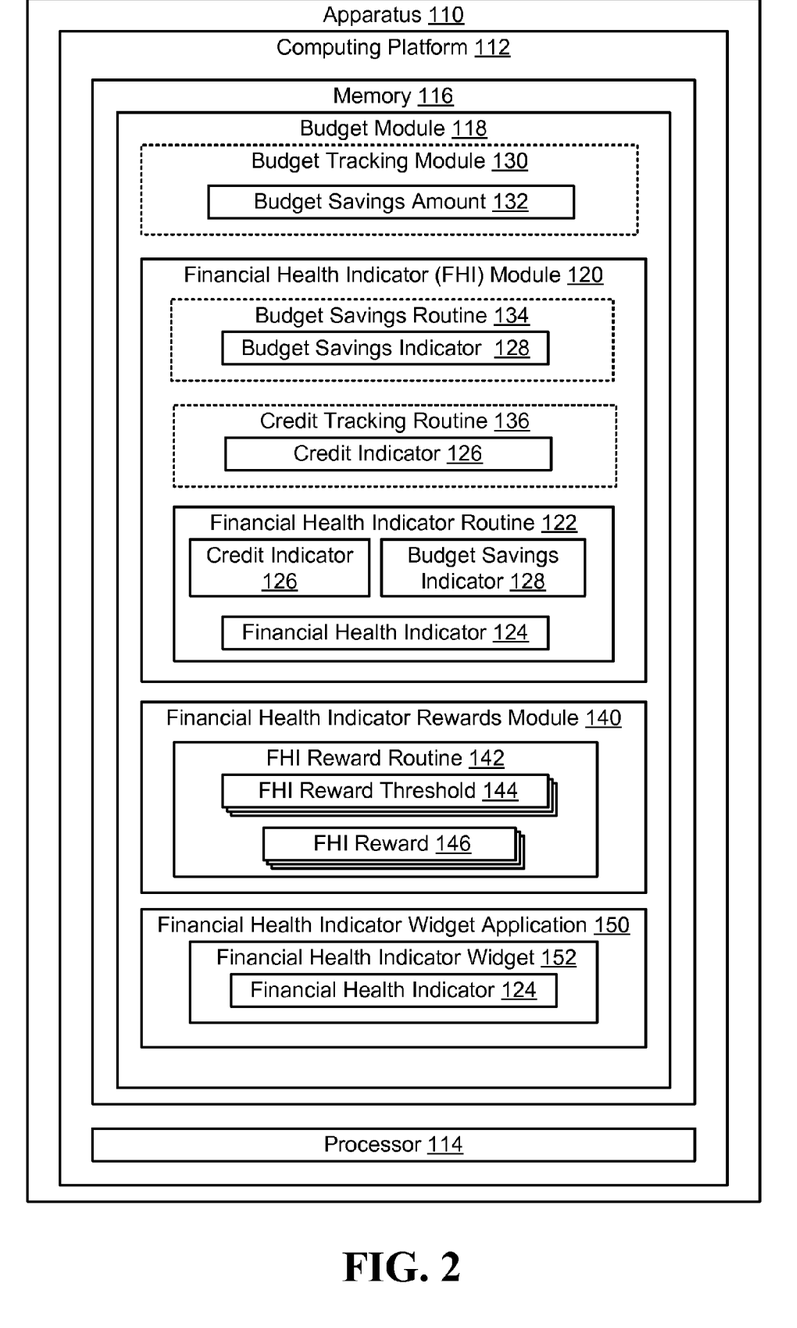
FIG. 2 is a block diagram depiction illustrating an apparatus configured to determine and present to the associated user a financial health indicator in a budget tracking system, in accordance with embodiments of the present invention.

Turning the reader's attention to FIG. 2, a more detailed block diagram of apparatus 110 is depicted that highlights various optional embodiments of the budget tracking system and, specifically, the Financial Health Indicator (FHI), in accordance with embodiments of the present invention. As previously noted, apparatus 110, which may comprise more than one device, includes a computing platform 112 having a memory 116 and at least one processor 114. The memory 116 stores a budget tracking module 118 that is operable to provide a comprehensive budgeting system for users.

According to certain optional embodiment the budget module 118 may include a budget tracking module 130 that is operable to track the user's expenditures versus target budget allocation for a plurality of budget categories. Based on this tracking, the budget tracking module 130 is able to determine the user's budget savings amount 132, which may be the user's current short-term, long-term or comprehensive budget savings amount.

The financial health indicator module 120 may optionally include a budget savings routine 134 operable to dynamically determine a budget savings indicator 128, such as a budget savings score or the like, based on the budget savings amount 132. In addition, the financial health indicator module 120 may optionally include a credit tracking routine 136 operable to track or monitor the user's credit and to determine a credit indicator 126, such as a credit score or the like, based on the user's tracked credit scores or results.

As previously noted and discussed in relation to FIG. 1, the financial health indicator module additionally includes a financial health indicator routine operable to determine the user's financial health indicator 124 based on the credit indicator 126 and the budget savings indicator 128. The financial health indicator may take the form of a numerical financial health indicator score, an alphabetic financial health indicator grade, a color on a financial health indicator color spectrum or any other form that provides for financial health indication.

The financial health indicator module 120 may additionally include a financial health indicator rewards module 140 operable to provide rewards to the budget user if the financial health indicator reaches or sustains a certain predetermined financial health indicator threshold. Thus the financial health indicator rewards module 140 includes a financial health indicator rewards routine 142 operable to track the user's financial health indicator to determine if the financial health indicator meets or sustains a rewards threshold 144. In certain embodiments of the invention, a reward 146 may be obtained if the user meets a reward threshold 144 (i.e., a financial health indicator predetermined level), while in other embodiments the user may be required to sustain a predetermined financial health indicator reward threshold 144 for a predetermined period of time in order to achieve the reward 146.

In certain embodiments of the invention, the financial health indicator reward 146 may be an advantageous rate on a financial institution account, such as an advantageous mortgage rate, an advantageous savings account rate, an advantageous certificate of deposit rate or the like. In other embodiments of the invention, the financial health indicator reward 146 may be an advantageous or discounted price for a product or service, such as a discounted price for a financial institution product or service. In still further embodiments of the invention, the financial health indicator reward 146 may be a token award, such as an external product/service discount, a gift certificate, a branded product or the like.

It should be noted that while the financial health indicator reward 146 may be configured to be automatically provided to the budget user upon meeting or sustaining the reward threshold, in other embodiments of the invention meeting or sustaining the reward threshold may prompt the budget system implementer to assess other qualifying criteria to assess the budget user's reward qualification, prior to providing the financial health indicator reward to the user. The budget user may be notified of a reward via communication sent by a preferred communication mechanism, such as email, SMS/text, voice mail, postal mail or the like.

The budget system 118 may also include a financial health indicator widget module 150 operable to provide for deploying a financial health indicator widget 152 to be displayed or otherwise presented on the user's networked device. Thus, the financial health indicator widget 152 may be stored and executed on a PC, a laptop, a hand-held device, such as a cellular telephone, PDA, a network-capable credit card or the like. The financial health indicator widget 152 is operable to display or otherwise present the financial health indicator 124 on a dashboard-type interface or any other graphical user interface that provides for ease in user access. According to one embodiment of the invention, the financial health indicator widget 152 may provide for the user to configure for continual display/presentation of the dynamic financial health indicator 124, so that the user is presented with a continual reminder of their budget status in relation to their financial health indicator.

Figure 3:
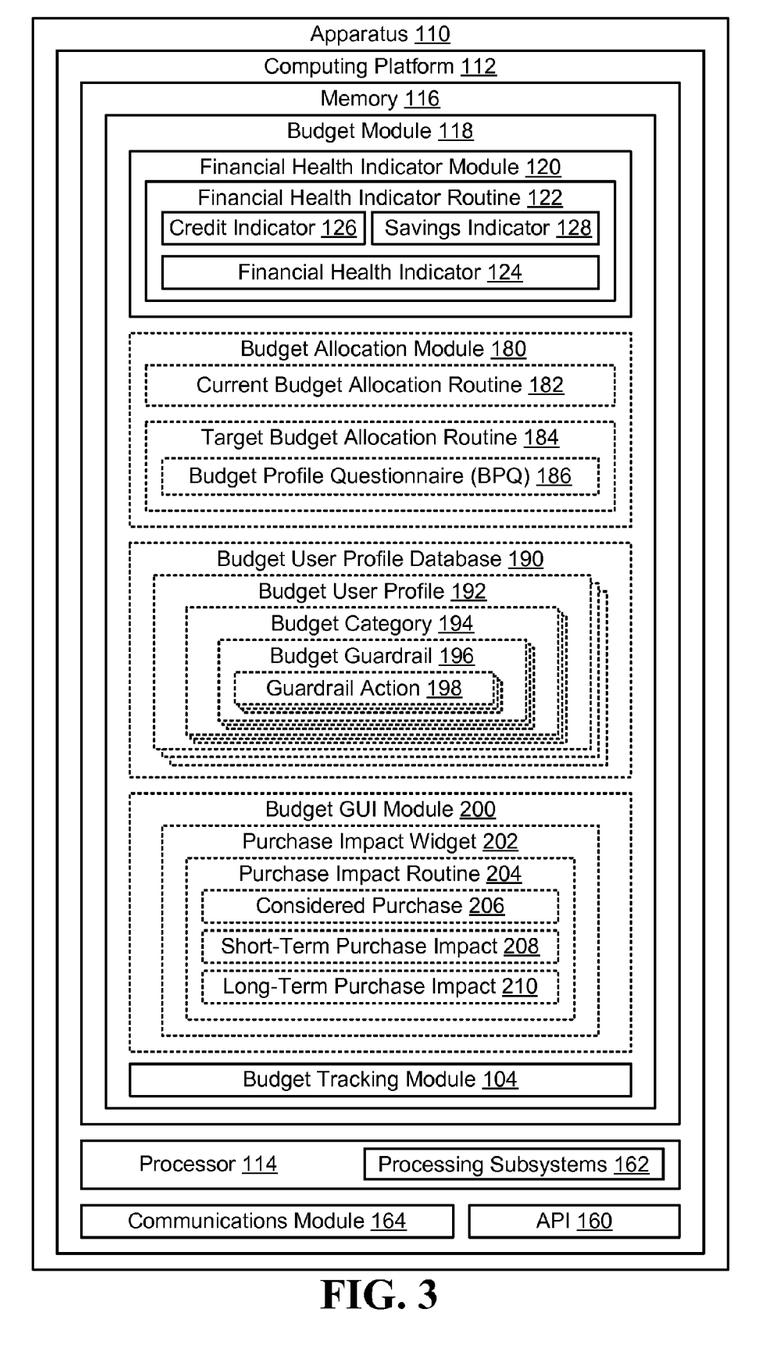
FIG. 3 is a more detailed block diagram of an apparatus configured for providing a budget tracking system, in accordance with an embodiment of the present invention.
Figure 4:
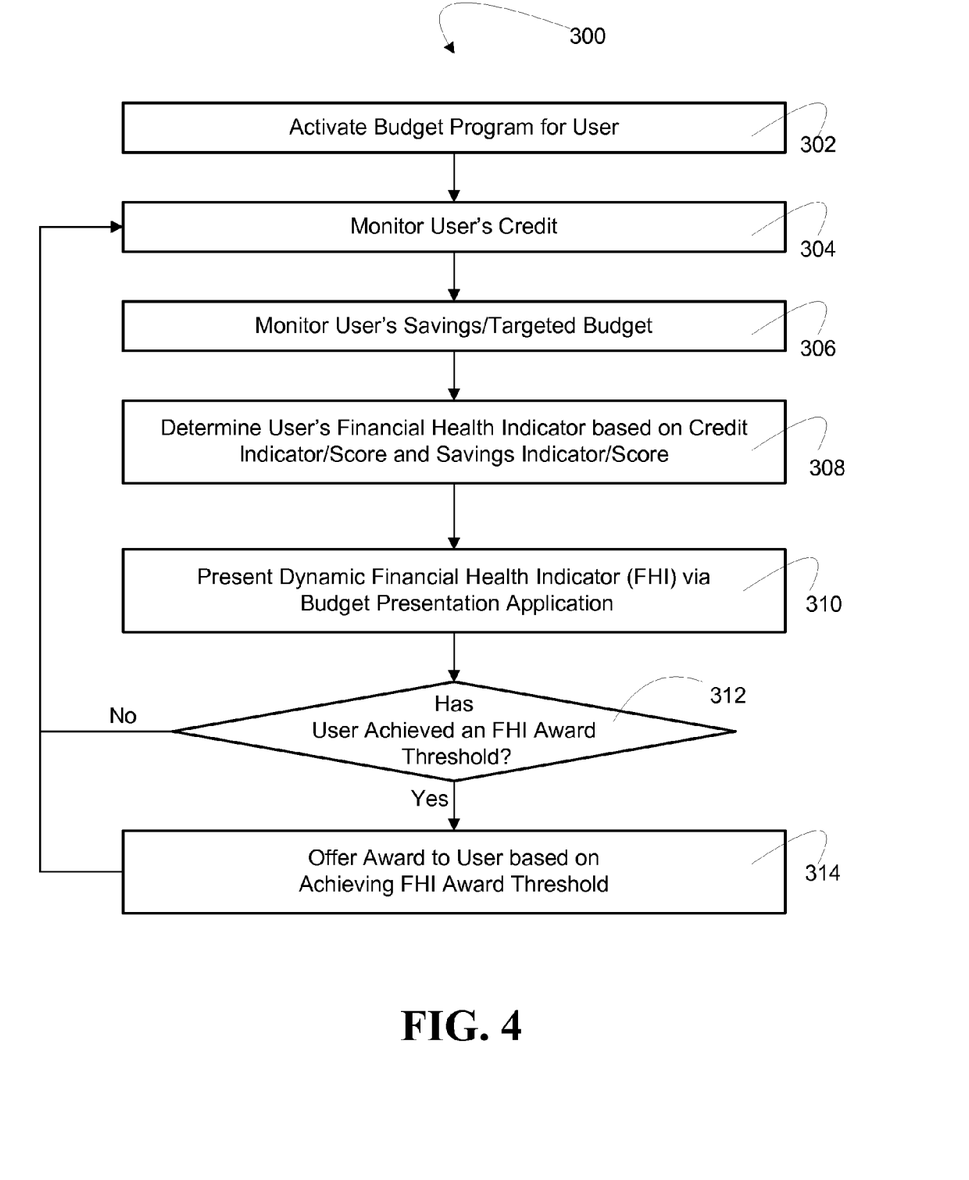
FIG. 4 is a flow diagram of a method for determining a financial health indicator, in accordance with present embodiments.

Referring to FIG. 3, a more detailed block diagram is depicted of apparatus 110 that highlights various additional aspects of the budget system 100 herein disclosed. The apparatus 110 may include any type of one or more computerized, communication devices, such as a server, a personal computer, a portable computer, or any device or devices that include a computing platform and have a wired and/or wireless connection to a network or the Internet.

The apparatus 110 includes computing platform 112 that can transmit data across a network, and that can receive and execute routines and applications. Computing platform 112 includes memory 116, which may comprise volatile and non-volatile memory such as read-only and/or random-access memory (RAM and ROM), EPROM, EEPROM, flash cards, or any memory common to computing platforms. Further, memory 116 may include one or more flash memory cells, or may be any secondary or tertiary storage device, such as magnetic media, optical media, tape, or soft or hard disk.

Further, computing platform 112 also includes processor 114, which may be an application-specific integrated circuit ("ASIC"), or other chipset, processor, logic circuit, or other data processing device. Processor 114 or other processor such as ASIC may execute an application programming interface ("API") 160 that interfaces with any resident programs, such as budget module 118 stored in the memory 116 of the apparatus 110.

Processor 114 includes various processing subsystems 162 embodied in hardware, firmware, software, and combinations thereof, that enable the functionality of apparatus 110 and the operability of the apparatus 110 on a network. For example, processing subsystems 162 allow for initiating and maintaining communications, and exchanging data, with other networked devices. For the disclosed embodiments, processing subsystems 162 of processor 114 may include any subsystem used in conjunction with budget module 118.

Computing platform 112 additionally includes communications module 164 embodied in hardware, firmware, software, and combinations thereof, that enables communications among the various components of the apparatus 110, as well as between the apparatus 110 and an external network, such as the Internet or the like. In described embodiments, the communication module 164 enables the communication of all correspondence between apparatus 110 and other computing devices, such as customer/user devices, 104, 106 and 108 (shown in FIG. 1).

As previously noted and discussed, the memory 116 of computing platform 112 includes a financial health indicator module 120 that is operable to dynamically determine and provide to the user an indicator of a user's financial health. In this regard, the financial health indicator module 120 may include a financial health indicator routine 122 that is operable to determine a financial health indicator 124 of the user's financial health based on a credit indicator 126 and a budget indicator 128. The credit indicator 126 may be one or more credit scores as provided by a credit reporting bureau. If a financial institution is implementing the budget system of the present invention they may generally have access to a customer's credit score(s). According to one embodiment, the financial health indicator routine 122 may dynamically track the user's credit scores to provide for a credit indicator/score. The budget indicator 128 may be determined based on budget tracking accomplished via budget tracking module 130. By constantly tracking, monitoring and/or determining a budget indicator 128 and a credit indicator 126, the resulting financial health indicator 124 is a dynamic indicator that accurately reflects the financial health of the user at any point in time.

As previously noted, the financial health indicator 124 may be in a form that indicates the user's financial health, such as, but not limited to, a numerical score, an alphabetic grade, a color on a color scale or the like.

The financial health indicator 124 may be communicated or otherwise provided to the customer/user based on budget system configuration and/or customer/user configuration. In one embodiment the financial health indicator 194 may be provided as a widget running on a dashboard-type application, such that the financial health indicator 124 is dynamically accessible to the customer/user from any networked device, such as a personal computer, laptop computer or a hand-held device, such as a cellular telephone device or the like.

The budget system module 118 may also provide for budget allocation module 180 that is operable to determine a target budget allocation for a financial institution customer based on current budget allocation and user responses to a budget profile questionnaire (BPQ) or allowing a user to select a target budget based on peer data recommendations. As such, budget allocation module 180 includes a current budget allocation routine 182 operable to provide for the user's current budget allocation and a target budget allocation routine 184 that is operable to provide for the target budget allocation based on the current budget allocation and user responses to the BPQ 186.

Additionally, the budget module 118 may include a budget user profile database 190 that may store a plurality of budget user profiles 192. Each budget user profile 192 may define a plurality of user-defined or budget system defined budget categories 194, such as housing, food, entertainment, transportation and the like. Each budget category 194 may provide for one or more user-defined budget guardrails 196 and each guardrail will have one or more related guardrail actions 198. In this regard, a guardrail is a user defined spending limit that upon either being met or proximate to being met, depending on system or user configuration, prompts the occurrence of the guardrail action. The guardrail action may either be user-defined or budget system defined. As such budget tracking module 130 is operable to track the expenditures made by the customer/user and initiate the defined guardrail action if a user's pre-defined guardrail spending limit has been met or is proximate to being met.

According to still further embodiments, the budget module 118 may include a budget Graphical User Interface (GUI) module 200 operable to provide the user a displayable interface communicated via a network and operable for receiving and inputting budget tracking related information. The budget GUI module 200 may include a purchase budget impact widget 202 that is operable to provide for determination of the budget impact of an actual purchase, considered purchase, an adjustment to an ongoing purchase. The widget may be displayed to the user via a dashboard-type application that provides for various other budget-related tools, modules, widgets and the like.

Thus, purchase budget impact widget 202 may include purchase budget impact routine 204 that is operable to determine the budget impact of a purchase, considered purchase or an adjustment to an ongoing purchase, rental, etc. Thus, the purchase budget impact widget 202 may include a purchase/adjustment input 206 operable to receive a customer/user input of a purchase amount, considered purchase amount or adjustment amount. In this regard, if the widget is accessible to the user via a hand-held device, such as a cellular telephone or the like, the user can engage the purchase budget impact widget 202 and input an amount at any point in time, such as just prior to making a purchase to determine the budget impact of the purchase. As such, the budget impact determiner aspect of the invention provides for the user to make informed purchasing decisions and hopefully limits the amount of impulsive purchases.

The purchase budget impact routine 204 may be configured to determine a short-term budget impact 208 and/or a long-term budget impact 210 for the inputted amount. A short-term budget impact 208 may be, for example, a month, a portion of a month, a portion of a year or the like. The long-term budget impact 210 may be, for example, periods greater than a year or the like. In alternate embodiments of the invention, the purchase budget impact widget 202 may include logic (not shown in FIG. 3) operable to determine recurring purchases for the user and to automatically activate the widget and provide the user with the budget impact for the recurring purchase, for example, if the user was to forego or limit the number of recurring purchases. In one example, the logic would determine that the user makes a daily or frequent purchase of coffee at a particular coffee shop, based on the identification of this recurring purchase, the widget may be automatically activated and presented to the user to display the short-term and/or long-term budget impact of foregoing the recurring purchase or otherwise limiting the number of the recurring purchases.

Figure 5:
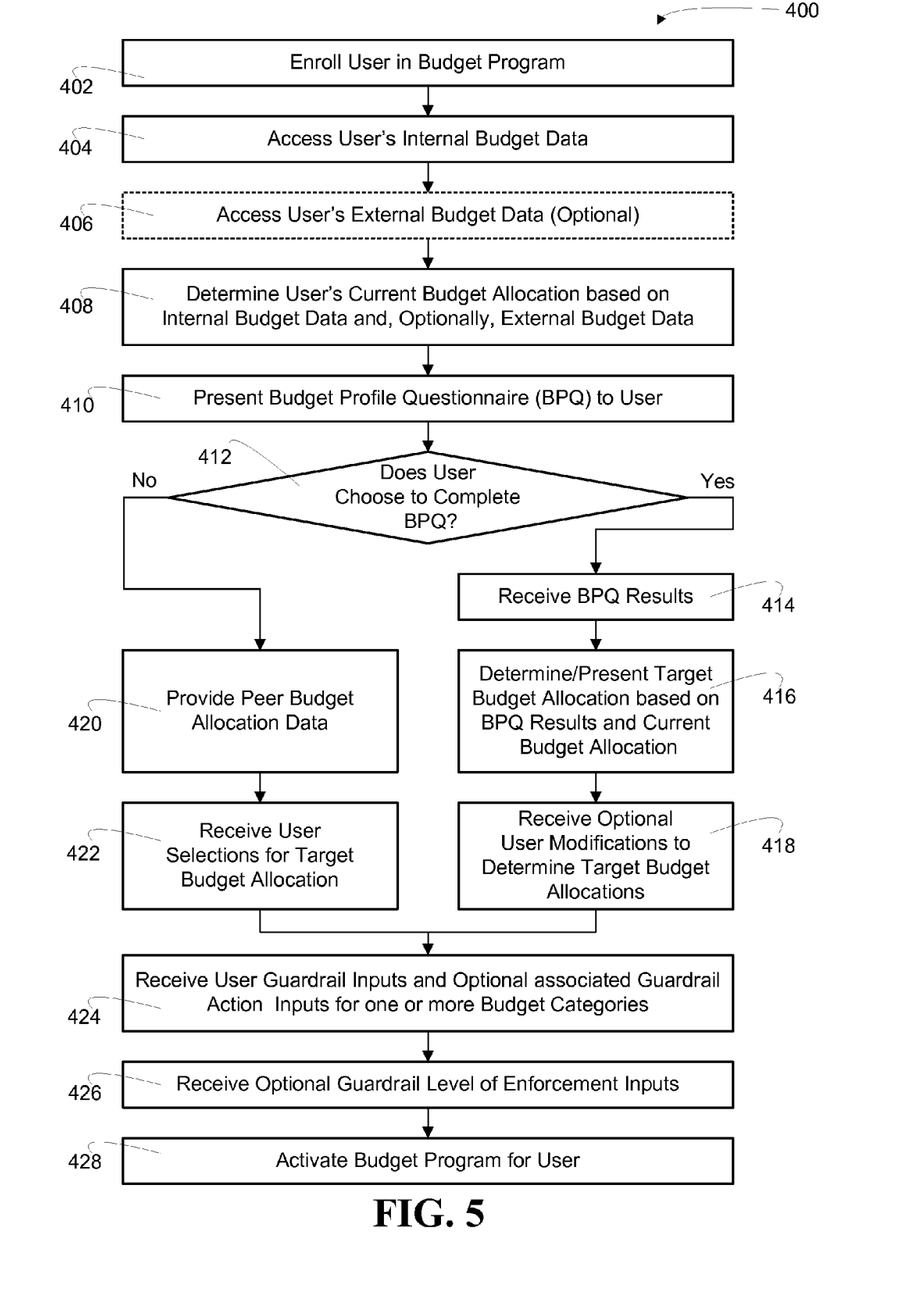
FIG. 5 is a flow diagram detailing a method for determination and/or selection of a target budget allocation and associated budget guardrails, in accordance with present embodiments.

Turning the reader's attention to FIG. 5, a method 300 is detailed for determining a financial health indicator for a user of an associated budget system, in accordance with an embodiment of the present invention. At Event 302, the budget system is activated for a user. Activation is typically preceded by determining or selecting a target budget allocation and, optionally, defining guardrails and associated guardrail actions for one or more target budget allocation categories.

At Event 304, the user's credit is dynamically monitored or otherwise tracked. Credit monitoring may include monitoring a user's credit score as provided by one or more credit reporting bureaus. In one embodiment of the present invention, a plurality of user credit scores are monitored from different credit reporting bureaus, subsequently weighted to allow for a difference in the score and averaged to determine a collective credit score for the budget user.

At Event 306, the user's savings (i.e., the user's ability to stay on budget) is dynamically monitored or otherwise tracked. The user's savings indicator may be based on short-term savings or long-term savings, or any combination of both. The savings indicator may provide for an overall savings score or the like.

At Event 308, a financial health indicator is determined for the user based on the credit indicator/score and the savings indicator/score. It should be noted that the financial health indicator may be based on factors other than the credit indicator/score and the savings indicator/score. In one specific embodiment, the financial health indicator is based on a ratio of about 70% credit indicator/score and about 30% savings indicator/score. The financial health indicator may be a numeric score, an alphabetic grade, a color on a color scale or the like.

At Event 310, the dynamic financial health indicator is presented to the user via a budget presentation (i.e., Graphical User Interface (GUI)) application. According to one embodiment, the financial health indicator may be presented to the user online via a budget system portal or the like. In other embodiments, the financial health indicator may be provided via a widget that runs on a dashboard-type budget application, As such, the financial health indicator may be provided to the user via any wired and/or wireless networked device, including, but not limited to, a PC, a laptop, a hand-held device, such as a cellular telephone or the like. The dynamic nature of the financial health indicator means that the indicator may fluctuate in real-time or near-real-time based on current expenditures made by the user.

At optional Decision 312, if the financial health indicator is associated with a rewards program, a determination may be continually made to determine if the user's financial health indicator has risen to a level (i.e., met a threshold or sustained a threshold for a predetermined period of time) to warrant a reward. Rewards may include, but are not limited to, better rates of return on a financial institution account, better pricing on financial institution services and/or products, a reward gift or the like. If a determination is made that the financial health indicator has risen to a reward level, at Event 314, the reward is automatically provided to or offered to the user or a determination is automatically triggered to determine if the user otherwise qualifies for the designated reward. If a determination is made that the financial health indicator has not risen to the reward level, the process returns to Event 304 for further tracking of the credit indicator/score and savings indicator/score, and dynamic determination of the financial health indicator based on the tracked credit indicator/score and savings indicator/score.

Referring to FIG. 5, a flow diagram is presented of a method 400 for determining a user's target budget allocation and defining guardrails, in accordance with present embodiments of the invention. At Event 402 the user enrolls in a budget program. In one example, the budget system may be implemented by a financial institution. In such embodiments, the user may be a pre-existing financial institution customer, and, in some embodiments, being a financial institution customer may be a pre-requisite to being afforded enrollment in the budget program. According to embodiments of the invention, enrollment, configuration of the user budget criteria and budget tracking information may be provided to the user via a network interface, such as an online website or the like. In one specific embodiment, in which the budget system is implemented by a financial institution, the configuration of the user budget criteria and/or budget tracking information may be accessible online via the financial institution's online banking site.

At Event 404, once the user has enrolled in the budget system, the budget system accesses internal databases, for example, financial institution customer portfolio databases, to retrieve budget-related information from the user's portfolio, such as account information and the like. The budget-related information may include customer transaction data, such as transaction receipts for electronic purchases, such as debit or credit purchases.

At optional Event 406, the budget system may access external databases, such as other financial institution databases, credit card company databases or the like, in an attempt to retrieve other budget-related information associated with the customer/user. By accessing, retrieving and subsequently using external data to determine the current budget information, the current budget allocations are generally more accurate and robust. Additionally, in embodiments in which the budget system is implemented by a financial institution, external data may be necessary in instances in which the user is a new customer or in instances in which the internal database information is not sufficient to provide an accurate depiction of the user's current budget allocation.

At Event 408, the user's current budget allocation is determined based on the internal budget-related data and, optionally, the external budget-related data. The current budget allocation breaks down current expenditures on a per category basis: for example, 30% housing, 10% fuel, 5% entertainment, 15% savings and the like.

At Event 410, the customer is presented with a Budget Profile Questionnaire (BPQ) that includes a plurality of budget-related questions. Specifically, one or more questions are related to the customer's current spending habits and one or more questions are related to determining the latent flexibility in the customer's current budget. At Decision 412, a determination is made as to whether the customer/user chooses to complete the BPQ.

If the customer/user chooses to complete the BPQ, at Event 414, BPQ results are received. The results may be weighted based on budget significance and subsequently scored to result in a BPQ score. At Event 416, a target budget allocation is determined based on the BPQ results or BPQ score and the current budget allocation, and subsequently presented to the user. Similar to the current budget allocation, the target budget allocation breaks down target expenditures on a per category basis. At Event 418, the user may modify the determined target budget allocations to meet their perceived needs.

If the user chooses not to complete the BPQ, at Event 420, peer budget allocation may be presented to the user as a guideline for selecting target budget allocation. The peer data may reflect national averages having or not having similar demographics as the user, financial institution customers or another budget system implementer having or not having similar demographics as the user, individuals residing proximate the user or the like. At Event 422, user budget allocation selections are received by the user, which serve to define the user's target budget allocation.

At optional Event 424, user guardrail inputs and, in some embodiments, associated guardrail action inputs are received for one or more of the categories in the target budget allocation. As previously noted the guardrail defines an expenditure limit at which the associated guardrail action may occur. In accordance with embodiments of the invention, the guardrail may be set at, below or above the target budget allocation for the category. The guardrail action may be pre-defined by the budget system or, in other embodiments, the user may be able to choose and configure the guardrail actions associated with a guardrail. The guardrail action may include, but is not limited to, a guardrail alert and/or a guardrail consequence or the like.

At optional Event 426, one or more user configurable guardrail parameters are received. The guardrail parameters may affect the guardrail limit and/or the guardrail action. For example, the guardrail may define a parameter that defines when the associated action should occur, for example, when the guardrail is met/exceeded or when expenditures are within a predetermined guardrail range. The guardrail action parameters are generally guardrail action specific. For example, if the guardrail action is a guardrail alert, a guardrail parameter may further define a user chosen communication mechanism, and/or a guardrail parameter may define a user selected frequency for communicating the alert once the guardrail has been met, or once the expenditures are within the predetermined guardrail range. If the guardrail action is a guardrail consequence, the guardrail parameter may define the type and/or amount of the consequence. For example, the guardrail consequence may be a contribution to a specified customer account or a contribution to a designated charity. Alternatively, the guardrail consequence may define further spending limitations for the category of interest, or a spending prohibition for the category of interest.

At Event 428, once the target budget has been determined or selected and any optional guardrails are set, the budget program is activated for the user and begins tracking expenditures as they pertain to the target budget allocations, tracking expenditures as they pertain to the guardrails and initiating the guardrail action if a guardrail is met, or if expenditures are within the predefined guardrail range.

Figure 6:
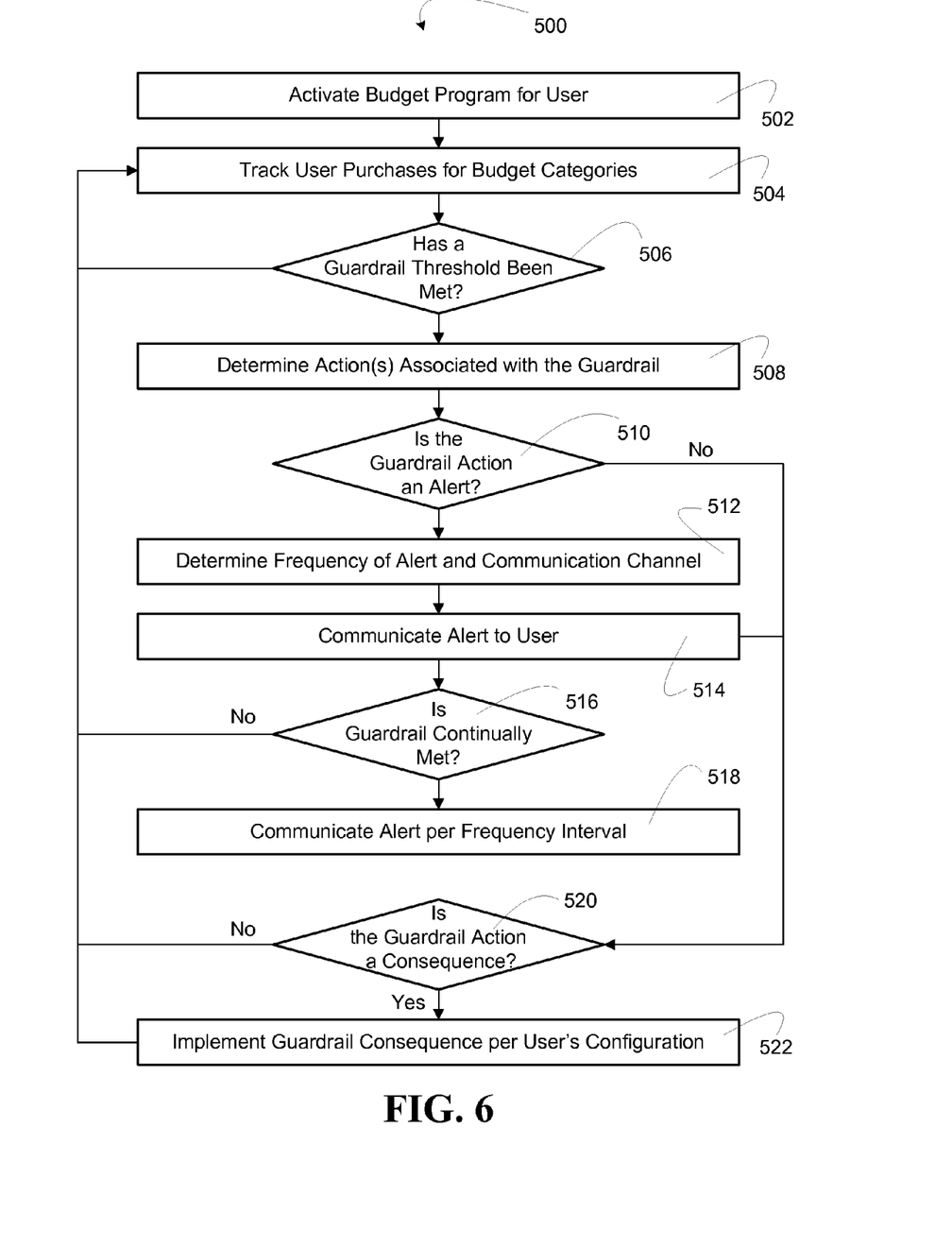
FIG. 6 is a flow diagram of a method for tracking budget expenditures and, in particular tracking user-defined budget guardrails, in accordance with present embodiments.

Referring to FIG. 6, a method 500 is provided for tracking guardrails and implementing the action associated with a guardrail in the event the guardrail is achieved, in accordance with embodiments of the present invention. At Event 502, the budget tracking program is activated for a specified user. As described in the flow diagram of FIG. 5, activation of the user is preceded by determination and/or selection of a target budget allocation and selection of guardrails and actions associated with the guardrails. At Event 504, the user's purchases and/or expenditures are tracked for budgeting purposes and applied to the plurality of budget categories.

At Decision 506, a determination is made as to whether a guardrail has been achieved or, if so configured, whether expenditures are within a specified predetermined range of a guardrail that prompts a guardrail action. If the guardrail has not been achieved or otherwise met, the flow returns to Event 502 for further tracking of user's purchases and expenditures. If a guardrail has been determined to be met, then at Event 508, the action or actions associated with the guardrail are determined.

At Decision 510, a determination is made as to whether the guardrail action is an alert. If the guardrail action is determined to be an alert, then at Event 512, the frequency of the alert is determined and the communication channel for the alert is determined. The frequency of the alert and/or the communication channel for the alert may be user-configured or configured within the budget system. Frequency of the alert pertains to how frequently the alert will be communicated to the user during the current budget period, for example, during the current month, once the guardrail has been achieved, or once expenditures are within the predetermined range for prompting guardrail action. The communication channel may be an online communication, email communication, SMS/ text communication, voice mail communication or the like. In one embodiment of the invention, the user may configure the budget system to communicate the alert via more than one communication channel. At Event 514, the alert is communicated to the user via the designated communication channel.

At Decision 516, a determination is made as to whether the guardrail threshold is continually being achieved. In some instances, it may be possible to achieve a guardrail for a specified budget period and subsequently fall below the guardrail, for example, if negative expenditures occur in the category in which the guardrail was achieved. If the guardrail is no longer being achieved, then the flow returns to Event 504 for further tracking of user expenditures. If the guardrail continues to be achieved (i.e., the guardrail threshold is met), then at Event 518, the alert is communicated to the user at the predefined frequency interval.

If a determination is made that the guardrail action is or is not an alert, at Decision 520, a determination is made as to whether the guardrail action is a consequence. It should be noted that while the flow diagram of FIG. 5 is limited to guardrail actions being alerts and/or consequences, it is possible and within the confines of the present invention for the guardrail action to be any other action aside from an alert or consequence. As previously noted the consequence may come in the form of a contribution to a user's financial institution account, such as a savings account, an IRA or the like, a contribution to a designated charity, or a prohibition or limitation of further spending in the category associated with the guardrail. If the guardrail action is determined to be a consequence then, at Event 522, the consequence is implemented per the user's configuration as to the type of consequence and the amount or severity of the consequence. If the guardrail action is determined to not be a consequence, the flow returns to Event 504 for further tracking of the user's expenditures.

Figure 7:
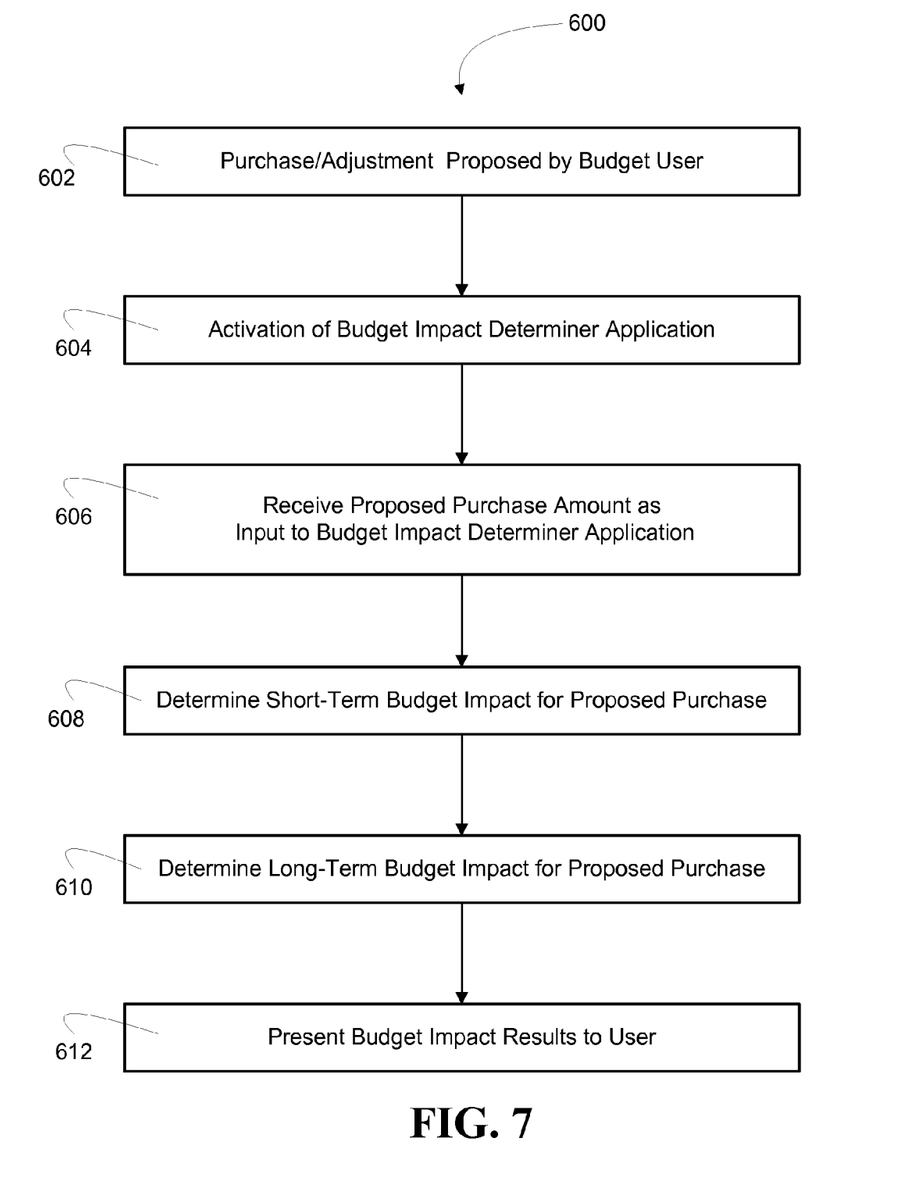
FIG. 7 is a flow diagram of a method for providing purchase impact determination in budget system, in accordance with an embodiment of the present invention.

Referring to FIG. 7 a flow diagram is depicted of a method 600 for budget impact determination, in accordance with an embodiment of the present invention. At Event 602, the budget system user is presented with a proposed expenditure or an adjustment to a pre-existing expenditure, such as a change in a mortgage payment or the like. At Event 604, based on the proposed expenditure, the user activates a budget impact determiner application. It should be noted that while the illustrated flow requires an expenditure or expenditure adjustment to be proposed or otherwise contemplated by the budget user, in practice and within the context of the invention, the budget impact determiner application can be accessed at any point in time by the user, prior to an expenditure or after an expenditure has been undertaken. In one embodiment of the invention, the budget impact determiner application is accessible via the user's hand-held device, such as a cellular telephone; as such, the user may access the application at a point-of-sale, such as a retail outlet, prior to making a purchase to assess the budgetary impact of the purchase.

At Event 606, the proposed expenditure amount or expenditure adjustment is inputted into the budget impact determiner application. It should be noted that one alternate embodiment of the application provides for the application to logically determine recurring expenditures, which, once determined, provide for the automatic launch of the budget impact determiner application and the automatic input of the recurring expenditure amount, such that the application automatically determines the budget impact of the recurring purchase and presents the results to the user.

At Event 608, the application determines the short-term budget impact of the expenditure. The short-term budget impact may be any short-term period as defined by the user or the system. For example, the short-term period may be a month, a portion of the month, a year or a portion of the year. At Event 610, the application determines the long-term budget impact of the expenditure. The long-term budget impact may be any long-term period as defined by the user or the system. For example, the long-term period may be a year, or any period greater than a year. At Event 612, the results of the budget impact determination are presented to the user or otherwise communicated to the user.

Figure 8:
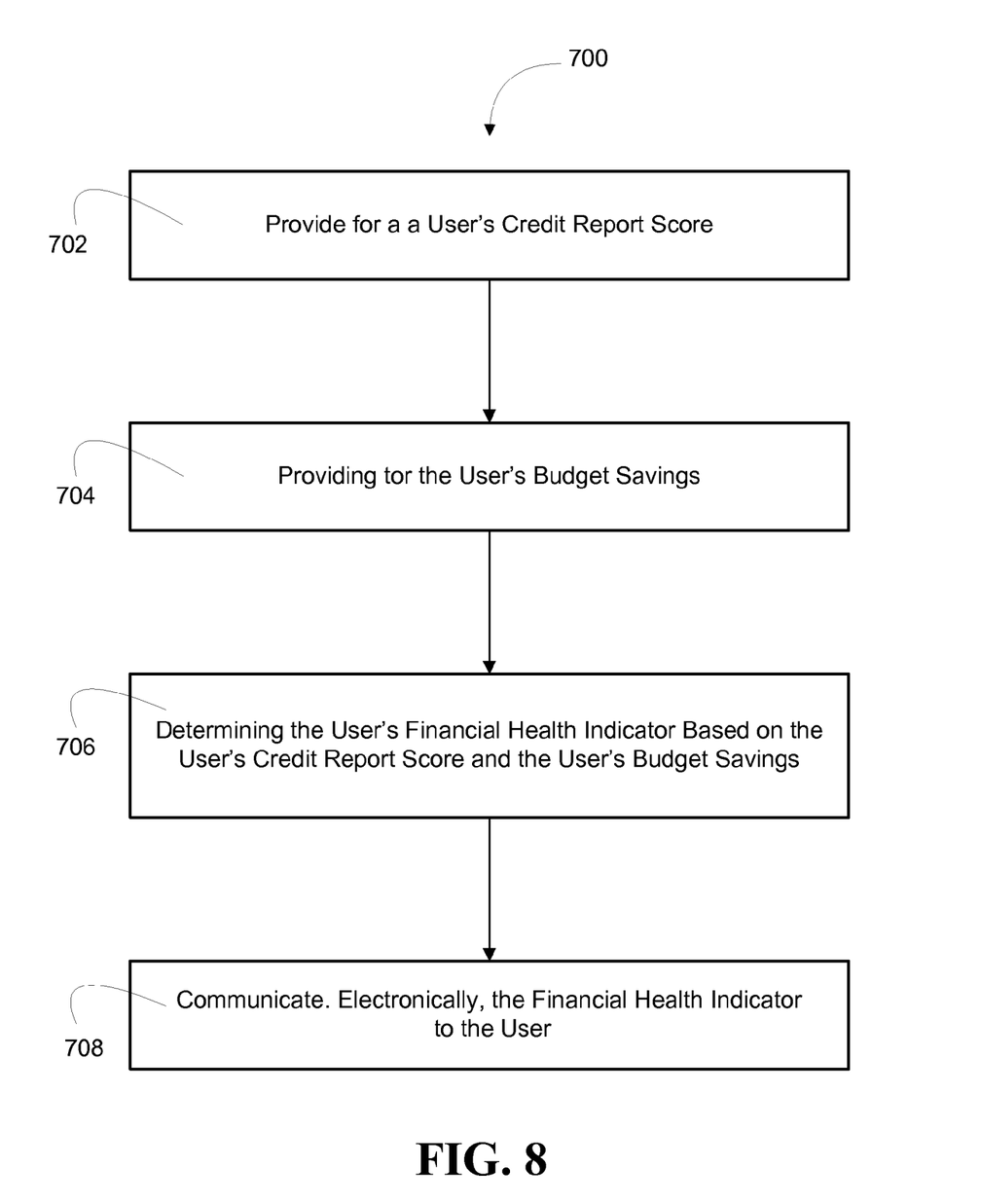
FIG. 8 is a flow diagram of a method for providing for a financial health indicator, in accordance with yet another embodiment of the present invention.

Referring to FIG. 8, a flow diagram is depicted of a method 700 for providing a financial health indicator to a user of budget system, in accordance with an embodiment of the present invention. At Event 702, a user's credit score is provided. According to certain embodiments, providing the user's credit score may further include tracking one or more credit reporting bureaus to constantly monitor the user's credit score. According to one specific embodiment, tracking one or more credit reporting bureaus may further including tracking three credit reporting bureaus, such as Equifax®, TransUnion®, Experian® or the like and averaging the user's credit report score from the three credit reporting bureaus.

At Event 704, the user's budget savings is provided. According to certain embodiments of the invention, providing the user's budget savings may further include tracking the user's expenditures and comparing the expenditures to the user's predetermined target budget allocation to determine the budget savings. The budget savings, which is generally in the form of a quantified amount, may be converted to a budget savings score prior to determining the financial health indicator.

At Event 706, the user's financial health indicator is determined based on the user's credit report score and the user's budget savings. According to certain embodiment of the invention, the user's financial health indicator may be determined, dynamically, based on dynamically tracking the user's credit report score and/or dynamically tracking the user's budget savings. The financial health indicator may be a numerical score, an alphabetic grade or a color within a financial health color spectrum/scale.

At Event 708, the financial health indicator is communicated, electronically, to the user of the budget system. In accordance with certain embodiments of the present invention, communicating the financial health indicator may further include providing for the display of the financial health indicator on an online-accessible budget system portal and/or providing for the display of the financial health indicator on the user's wireless communication device.

According to optional embodiments of the method 700 described in relation to FIG. 8, the method may further provide for tracking the user's financial health indicator and determining if the tracked financial health indicator achieves a predetermined financial health indicator threshold. In certain embodiments, the financial health indicator threshold is a rewards threshold that provides for rewards to be provided to the user if the financial health indicator meets or sustains the threshold for a predetermined time period. The rewards may include, but are not limited to, preferred rates of return on financial institution accounts or preferred pricing on financial institution services/products.

Thus, methods, systems, computer program products and the like provide for a financial health indicator. The financial health indicator provides a dynamic indication of a user's financial health in terms of their current credit worthiness and their current ability to save in relation to a budget. In this regard, the financial health indicator is based on a user's credit report score, such as one or more FICO type credit scores and the user's savings as indicated by a budget tracking system. In embodiments of the invention in which the financial health indicator is implemented in conjunction with a budget tracking system, the financial health indicator provides necessary feedback to the user that serves to inform the user as to how they are performing in terms of staying on track to their individual budget allocations. Additionally, in certain embodiments, the provider of the budget tracking system may provide for awards based on achieving a predefined financial health indicator level and/or score.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for providing a financial health indicator, the method comprising:
   determining, via a computing device processor, a target budget allocation for a user based on a current budget allocation of the user and responses to a budget profile questionnaire;
   constantly monitoring, via a computing device, a credit report score associated with a user;
   constantly monitoring, via a computing device, a budget savings amount associated with the user, wherein the budget savings amount reflects expenditures, as they occur, made by the user compared to the target budget allocation;
   determining, via a computing device processor, a financial health indicator for the user based on the credit report score and the budget savings amount, wherein the financial health indicator is configured to fluctuate in real-time based on at least one of a change in the credit report score and a change in the budget savings amount; and
   communicating, via a computing device, the financial health indicator to the user.

2. The method of claim 1, wherein constantly monitoring the credit report score further comprises constant monitoring, via a computing device processor, at least one credit report bureau for the credit report score.

3. The method of claim 1, wherein continuously constantly monitoring the credit report score further comprises continuously constantly monitoring, via a computing device processor, a plurality credit report bureaus for individual credit report scores associated with the user and averaging the individual credit report scores to yield the credit report score.

4. The method of claim 1, further comprising receiving, via a computing device processor, user selections for the target budget allocation based on providing the user with peer budget allocation data.

5. The method of claim 1, wherein communicating further comprises providing for computing device display of the financial health indicator on an online-accessible budget system program.

6. The method of claim 1, wherein communicating further comprises providing for the display of the financial health indicator on a wireless communication device.

7. The method of claim 1, wherein determining the financial health indicator further defines the financial health indicator as a financial health score.

8. The method of claim 1, wherein determining the financial health indicator further defines the financial health indicator as a color within a financial health color spectrum.

9. The method of claim 1, further comprising tracking, via a computing device processor, the financial health indicator.

10. The method of claim 9, further comprising determining, via a computing device processor, an occurrence of the financial health indicator achieving a predetermined financial health indicator threshold.

11. The method of claim 10, further comprising awarding, automatically, a financial health indicator reward based on the occurrence of the financial health indicator achieving the predetermined financial health indicator threshold.

12. The method of claim 11, wherein awarding, automatically, the financial health indicator reward further defines the reward as one of a preferred rate of return on a financial institution account, or a preferred price on a financial institution product.

13. An apparatus for providing a financial health indicator, the apparatus comprising:
   a computer platform including at least one processor and a memory; and
   a budget module stored in the memory, executable by the processor and configured to constantly monitor expenditures, as they occur, for users, wherein the budget module comprises:
      a target budget allocation determiner routine configured to determine a target budget allocation for a user based on a current budget allocation of the user and responses to a budget profile questionnaire, and a financial health indicator routine operable to constantly monitor both a credit report score associated with the user and a budget savings amount associated with the user, determine a financial health indicator for the user based on the credit report score and the budget savings amount and initiate electronic communication of the financial health indicator to the user, wherein the budget savings amount reflects expenditures, as they occur, made by the user compared to the target budget allocation, and wherein the financial health indicator is configured to fluctuate in real-time based on at least one of a change to the credit report score and a change to the budget savings amount.

14. The apparatus of claim 13, wherein the financial health indicator routine is further configured to constantly monitor at least one credit report bureau for the credit report score.

15. The apparatus of claim 13, wherein the financial health indicator routine is further configured to constantly monitor a plurality of credit report bureaus for the individual credit report scores associated with the user and average the individual credit report scores to yield the credit report score.

16. The apparatus of claim 13, wherein the budget module further comprises target budget allocation selection routine configured to determine peer budget allocation data associated with the user, provide the peer budget allocation data to the user and receive user selections for the target budget allocation based on providing the user with peer budget allocation data.

17. The apparatus of claim 13, wherein the financial health indicator routine is further configured to provide for a display of the financial health indicator on an online-accessible budget system program.

18. The apparatus of claim 13, wherein the financial health indicator routine is further configured to provide for initiating a display of the financial health indicator on a wireless communication device.

19. The apparatus of claim 13, wherein the financial health indicator routine is further configured to determine a financial health numerical score.

20. The apparatus of claim 13, wherein the financial health indicator routine is further configured to determine a financial health color-coded score as indicated within a financial health color spectrum.

21. The apparatus of claim 13, wherein the budget module further comprises a financial health indicator tracking routine configured to track the financial health indicator.

22. The apparatus of claim 21, wherein the financial health indicator tracking module is further configured to determine if the financial health indicator achieves a predetermined financial health indicator threshold.

23. The apparatus of claim 22, wherein the budget module further comprises a financial health indicator reward module configured to automatically award a financial health indicator reward if the financial health indicator achieves the predetermined financial health indicator threshold.

24. The apparatus of claim 23, wherein the financial health indicator awards module is further configured to award, automatically, a financial health indicator reward further defined as one of a preferred rate of return on a financial institution account, or a preferred price on a financial institution product.

25. A non-transitory computer-readable medium comprising:
a first set of codes for causing a computer to determine a target budget allocation for a user based on a current budget allocation of the user and responses to a budget profile questionnaire;
a second set of codes for causing a computer to constantly monitor a credit report score associated with the user;
a third set of codes for causing a computer to constantly monitor a budget savings amount associated with the user, wherein the budget savings amount reflects expenditures, as they occur, made by the user compared to the target budget allocation;
a fourth set of codes for causing a computer to determine a financial health indicator for the user based on the credit report score and the budget savings amount,
wherein the financial health indicator is configured to fluctuate in real-time based on at least one of a change to the credit report score and a change to the budget savings amount; and
a fifth set of codes for causing a computer to communicate, electronically, the financial health indicator to the user.

26. The non-transitory computer-readable medium of claim 25, wherein the second set of codes is further operable to cause the computer to constantly monitor at least one credit report bureau for the credit report score.

27. The non-transitory computer-readable medium of claim 25, wherein the second set of codes is further operable to cause the computer to constantly monitor a plurality of credit report bureaus for individual credit report scores associated with the user and average the individual credit report scores to yield the credit report score.

28. The non-transitory computer-readable medium of claim 25, further comprising a sixth set of codes for causing the computer receive user selections for the target budget allocation based on providing the user with peer budget allocation data.

29. The non-transitory computer-readable medium of claim 25, wherein the fifth set of codes is further operable to cause the computer to provide for the display of the financial health indicator on an online-accessible budget system program.

30. The non-transitory computer-readable medium of claim 25, wherein the fifth set of codes is further operable to cause the computer to provide for the display of the financial health indicator on a wireless communication device.

31. The non-transitory computer-readable medium of claim 25, wherein the fourth set of codes is further operable to cause the computer to determine a user's financial health score.

32. The non-transitory computer-readable medium of claim 25, wherein the fourth set of codes is further operable to cause the computer to determine a user's financial health indicator color-coded score as indicated within a financial health color spectrum.

33. The non-transitory computer-readable medium of claim 25, further comprising a sixth set of codes for causing a computer to track the financial health indicator.

34. The non-transitory computer-readable medium of claim 33, further comprising a seventh set of codes for causing a computer to determine if the financial health indicator achieves a predetermined financial health indicator threshold.

35. The non-transitory computer-readable medium of claim 34, further comprising a eighth set of codes for causing a computer to award, automatically, a financial health indicator reward if the financial health indicator achieves the predetermined financial health indicator threshold.

36. The non-transitory computer-readable medium of claim 35, wherein the eighth set of codes is further operable to cause the computer to award, automatically, a preferred rate of return on a financial institution account, or a preferred price on a financial institution product.

* * * * *